United States Patent
Rudelic

(10) Patent No.: US 9,778,874 B2
(45) Date of Patent: *Oct. 3, 2017

(54) DATA DEDUPLICATION

(71) Applicant: Micron Technology, Inc., Boise, ID (US)

(72) Inventor: John C. Rudelic, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/957,801

(22) Filed: Dec. 3, 2015

(65) Prior Publication Data
US 2016/0085474 A1    Mar. 24, 2016

Related U.S. Application Data

(63) Continuation of application No. 13/083,269, filed on Apr. 8, 2011, now Pat. No. 9,223,511.

(51) Int. Cl.
*G06F 3/06* (2006.01)
*G06F 12/02* (2006.01)

(52) U.S. Cl.
CPC .......... *G06F 3/0641* (2013.01); *G06F 3/0608* (2013.01); *G06F 3/0673* (2013.01); *G06F 3/0679* (2013.01); *G06F 12/023* (2013.01)

(58) Field of Classification Search
CPC .... G06F 3/0608; G06F 3/0641; G06F 3/0671; G06F 12/023
See application file for complete search history.

(56) References Cited

U.S. PATENT DOCUMENTS

| | | | |
|---|---|---|---|
| 6,092,145 A | 7/2000 | Kigami et al. | |
| 7,010,645 B2 | 3/2006 | Hetzler et al. | |
| 7,747,584 B1 | 6/2010 | Jernigan | |
| 7,908,436 B1 | 3/2011 | Srinivasan et al. | |
| 9,223,511 B2 * | 12/2015 | Rudelic | G06F 3/0641 |
| 2005/0152192 A1 | 7/2005 | Boldy et al. | |
| 2006/0090052 A1 | 4/2006 | Leung | |

(Continued)

FOREIGN PATENT DOCUMENTS

| | | |
|---|---|---|
| CN | 101286156 | 10/2008 |
| CN | 101479944 | 7/2009 |

(Continued)

OTHER PUBLICATIONS

International Search Report and Written Opinion for related PCT Application No. PCT/US2012/030713, mailed Oct. 29, 2012, (9 pgs.).

(Continued)

*Primary Examiner* — Edward Dudek, Jr.
(74) *Attorney, Agent, or Firm* — Brooks, Cameron & Huebsch, PLLC

(57) ABSTRACT

The present disclosure includes devices and methods for data deduplication. One such method includes receiving a write command, transforming data associated with the write command, determining if a transformation value of the data exists in a transformation table, and responsive to a determination that the transformation value does not exist in the transformation table, writing the data associated with the write command to a memory device.

20 Claims, 3 Drawing Sheets

(56) References Cited

U.S. PATENT DOCUMENTS

| | | |
|---|---|---|
| 2008/0294696 A1 | 11/2008 | Frandzel |
| 2009/0089483 A1 | 4/2009 | Tanaka et al. |
| 2009/0113152 A1 | 4/2009 | Eguchi et al. |
| 2009/0132619 A1 | 5/2009 | Arakawa et al. |
| 2010/0161931 A1 | 6/2010 | Wang |
| 2010/0250896 A1 | 9/2010 | Matze |
| 2011/0055471 A1 | 3/2011 | Thatcher et al. |
| 2011/0131390 A1* | 6/2011 | Srinivasan ............ G06F 3/0622 711/209 |
| 2012/0197853 A1 | 8/2012 | Zheng et al. |
| 2012/0226672 A1 | 9/2012 | Hayashi et al. |
| 2014/0250088 A1* | 9/2014 | Klose ................. G06F 11/1453 707/692 |

FOREIGN PATENT DOCUMENTS

| | | |
|---|---|---|
| EP | 2012235 | 1/2009 |
| JP | 2009-087021 | 4/2009 |
| JP | 2009129441 | 6/2009 |
| JP | 2009146381 | 7/2009 |
| WO | 2009117251 | 9/2009 |
| WO | 2011033582 | 3/2011 |

OTHER PUBLICATIONS

EP Search Report and Written Opinion from related EP Application No. 12767450.5, dated Jul. 17, 2014, 7 pages.

Office Action for related Japan Patent Application No. 2014-503683, dated Nov. 11, 2014, 7 pages.

Notice of Rejection for related Korea Patent Application No. 10-2013-7028250, dated Nov. 28, 2014, 9 pages.

Office Action for related Taiwan Patent Application No. 101112336, dated Mar. 12, 2015, 18 pages.

Office Action for related China Patent Application No. 201280023074.6, dated Jun. 23, 2015, 27 pages.

Notice of Rejection for related Japan Patent Application No. 2015-138522, dated Aug. 2, 2016, 5 pages.

* cited by examiner

314

| | | | |
|---|---|---|---|
| 320 — LA | HASH | 330 | PA — 340 |
| 320-1 — LA-1 | H-1 | 330-1 | PA-1 — 340-1 |
| 320-2 — LA-2 | H-2 | 330-2 | PA-2 — 340-2 |
| 320-3 — LA-3 | H-3 | 330-3 | PA-3 — 340-3 |
| 320-4 — LA-4 | H-3 | 330-3 | PA-3 — 340-3 |
| 320-5 — LA-5 | H-2 | 330-2 | PA-2 — 340-2 |
| 320-6 — LA-6 | H-3 | 330-3 | PA-3 — 340-3 |
| 320-M — LA-M | H-M | 330-M | PA-M — 340-M |

*Fig. 3*

DATA DEDUPLICATION

PRIORITY INFORMATION

This application is a Continuation of U.S. application Ser. No. 13/083,269, filed Apr. 8, 2011, the contents of which are included herein by reference.

TECHNICAL FIELD

The present disclosure relates generally to semiconductor memory devices and methods, and more particularly, to devices and methods for data deduplication.

BACKGROUND

Memory devices are typically provided as internal, semiconductor, integrated circuits and/or external removable devices in computers or other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

Memory devices are utilized as non-volatile memory for a wide range of electronic applications in need of high memory densities, high reliability, and low power consumption. Non-volatile memory may be used in a personal computer, a portable memory stick, a solid state drive (SSD), a personal digital assistant (PDA), a digital camera, a cellular telephone, a portable music player e.g., MP3 player, a movie player, and other electronic devices, among others. Data, such as program code, and system data, such as a basic input/output system (BIOS), are typically stored in non-volatile memory devices.

Memory systems can receive write commands from a host, with the write commands being associated with, e.g., including, data to be written to one or more memory devices of the memory system. The data associated with, e.g., in, a write command can include a number of portions, e.g., sectors, with each portion having a unique logical address associated therewith. Each logical address can be assigned a physical address associated with a physical location, and each portion of data in a write command can be written to a particular physical location associated with the physical address assigned to the logical address corresponding to each portion of the data. In various instances, different logical addresses can correspond to the same physical data such that the data is physically duplicated in one or more memory devices of the memory system. Writing duplicate data can unnecessarily decrease the storage capacity of a memory system, among other drawbacks.

BRIEF DESCRIPTION OF THE DRAWINGS

FIG. 3 illustrates a hash table representing a number of logical addresses, hash values, and physical addresses in accordance with one or more embodiments of the present disclosure.

DETAILED DESCRIPTION

Figure 1:
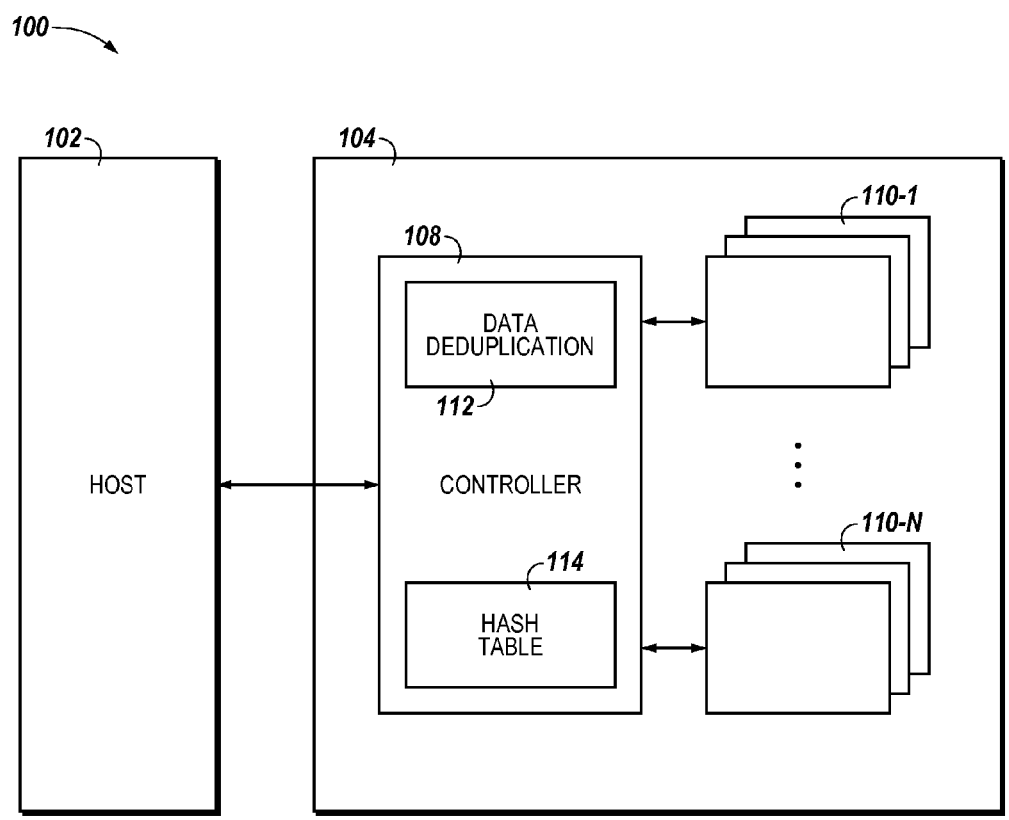
FIG. 1 is a functional block diagram of a computing device including at least one memory system, in accordance with one or more embodiments of the present disclosure.

The present disclosure includes devices and methods for data deduplication. One such method includes receiving a write command, transforming data associated with, e.g., from, the write command, determining if a transformation value of the data exists in a transformation table, and responsive to a determination that the transformation value does not exist in the transformation table, writing the data associated with the write command to a memory device.

Data deduplication can include avoiding writing duplicate data to a memory system. In previous approaches, a host would compare files to be written to a memory system with the files on the memory system to determine if a file is already present on the memory system and delete existing duplicate files present on the memory system. In such approaches, if a file was present on the memory system, the host would not send the command to write that file to the memory system, thus avoiding duplication of the file on the memory system. In one or more embodiments, data deduplication can include transforming, e.g., hashing, each sector of data that is received by a memory system from a host. The hashing of each sector of data can include generating a transformation value, e.g., hash value, for each sector of data received in a write command. Embodiments are not limited to hashing each sector of data and data can be hashed in any increment, such as pages, for example.

In one or more embodiments, the hash values generated for each sector of data can be compared to hash values in a transformation table, e.g., hash table, for data that is currently written to memory devices in a memory system. If a hash value generated for a sector of data received in a write command does not exist, e.g., is not present, in the hash table, the sector of data is written to a location in the memory devices and the hash table is updated by writing an entry to the hash table that includes the hash value of the sector data. The hash table can also be updated by writing an entry to the hash table that includes a logical address of the sector of data and a physical address of the sector of data. If a hash value generated for a sector of data received in a write command does exist in the hash table, the hash table is updated by writing an entry to the hash table to associate the logical address of the sector of data with the hash value of the sector data. A successful write indication can be sent to the host when the hash table is updated with the hash value and a logical address and physical address of the sector of data.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory devices can refer to one or more memory devices. Additionally, the designators "N" and "M" as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 is a functional block diagram of a computing device 100 including at least one memory system 104, in accordance with one or more embodiments of the present disclosure. In the embodiment illustrated in FIG. 1, the memory system 104 can include a controller 108 and one or more memory devices 110-1, . . . , 110-N. In this example, the controller 108 is external to the one or more memory devices 110-1, . . . , 110-N. The memory devices 110-1, . . . , 110-N can provide a storage volume for the memory system, e.g., with a file system formatted to the memory devices. The controller 108 can include control circuitry, e.g., hardware, firmware, and/or software. In one or more embodiments, the controller 108 can be an application specific integrated circuit (ASIC) coupled to a printed circuit board including a physical interface and memory devices 110-1, . . . , 110-N.

The controller 108 can include a data deduplication component 112 and a hash table 114. The data deduplication component 112 can include hardware, firmware, and/or software and can perform data deduplication operations on data, e.g., to determine if data exists in the memory devices 110-1, . . . , 110-N and if data should be written to the memory devices 110-1, . . . , 110-N. The hash table 114 can be stored in memory cells on the controller 108 and/or in memory cells of the memory devices 110-1, . . . , 110-N and can be used to associate a logical address with a hash value and also with a physical address for a portion of data, such as a sector. The hash table 114 can include a number of entries corresponding to logical addresses, hash values, and physical addresses for portions of data, e.g., sectors. The data deduplication component 112 can hash each sector of data that is received by a memory system from a host. While hashing each sector of data, a hash value for each sector of data received in a write command can be generated.

In one or more embodiments, data deduplication component 112 can compare the hash values generated for each sector of data to hash values in hash table 112 corresponding to data that is currently written to memory devices 110-1, . . . , 110-N. If a hash value generated for a sector of data received in a write command does not exist in hash table 114, the sector of data is written to a location in memory devices 110-1, . . . , 110-N and hash table 114 is updated by writing an entry to hash table 114 with the hash value of the sector of data. Hash table 114 can also be updated by writing an entry to hash table 114 to associate a logical address of the sector of data and a physical address of the sector of data with the hash value of the sector of data. If a hash value generated for a sector of data received in a write command does exist in hash table 114, hash table 114 can be updated by writing an entry to the hash table 114 to associate the logical address of the sector of data with the hash value of the sector data that is already hash table 114. A successful write indication can be sent to the host 102 when hash table 114 is updated with the hash value and a logical address and physical address of the sector of data.

As illustrated in FIG. 1, a host 102 can be coupled to the memory system 104. Host 102 can be a laptop computer, personal computer, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

In one or more embodiments, a physical host interface can be in the form of a standardized interface. For example, when the memory system 104 is used for data storage in a computing device 100, a physical host interface can be a serial advanced technology attachment (SATA), peripheral component interconnect express (PCIe), or a universal serial bus (USB), among other interfaces. In general, however, a physical host interface can provide an interface for passing control, address, data, and other signals between the memory system 104 and a host 102 having compatible receptors for the physical host interface. The host 102 can send write commands to the memory system 104 via physical host interface.

The controller 108 can communicate with the memory devices 110-1, . . . , 110-N to read, write, and erase data, among other operations. Controller 108 can have circuitry that may be one or more integrated circuits and/or discrete components. A memory controller could selectively couple an I/O connection (not shown in FIG. 1) of a memory device 110-1, . . . , 110-N to receive the appropriate signal at the appropriate I/O connection at the appropriate time. Similarly, the communication protocol between a host 102 and the memory system 104 may be different than what is required for access of a memory device 110-1, . . . , 110-N. Controller 108 could then translate the commands received from a host into the appropriate commands to achieve the desired access to a memory device 110-1, . . . , 110-N.

A memory device 110-1, . . . , 110-N can include one or more arrays of memory cells, e.g., non-volatile memory cells. The arrays can be phase change memory (PCM) arrays, for example. Embodiments are not limited to a particular type of memory device. For instance, the memory device can include RAM, ROM, HDD, DRAM, SDRAM, PCRAM, RRAM, and flash memory, among others.

The memory devices 110-1, . . . , 110-N can include a number of memory cells that can be grouped. As used herein, a group can include one or more memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included on a die. As an example, a 128 GB memory device can include 4314 bytes of data per page, 128 pages per block, 2048 blocks per plane, and 16 planes per device.

The embodiment of FIG. 1 can include additional circuitry that is not illustrated so as not to obscure embodiments of the present disclosure. For example, the memory system 104 can include a controller, e.g., control circuitry, and address circuitry to latch address signals provided over I/O connections through I/O circuitry. Address signals can be received and decoded by a row decoder and a column decoder to access the memory devices 110-1, . . . , 110-N. It will be appreciated by those skilled in the art that the number of address input connections can depend on the density and architecture of the memory devices 110-1, . . . , 110-N.

In general, the controller 108 can be responsible for converting commands received from the host 102, e.g., from a PCIe bus, into command instructions for host-memory translation circuitry and for converting memory responses into host system commands for transmission to the requesting host.

In one or more embodiments, data can be written to the memory devices one page at a time. Each page in the memory device can have a number of physical sectors and each physical sector can be associated with an LBA. As an example, a physical page can have 8 physical sectors of data. However, embodiments are not limited to a particular number of physical sectors per physical page.

Figure 2:
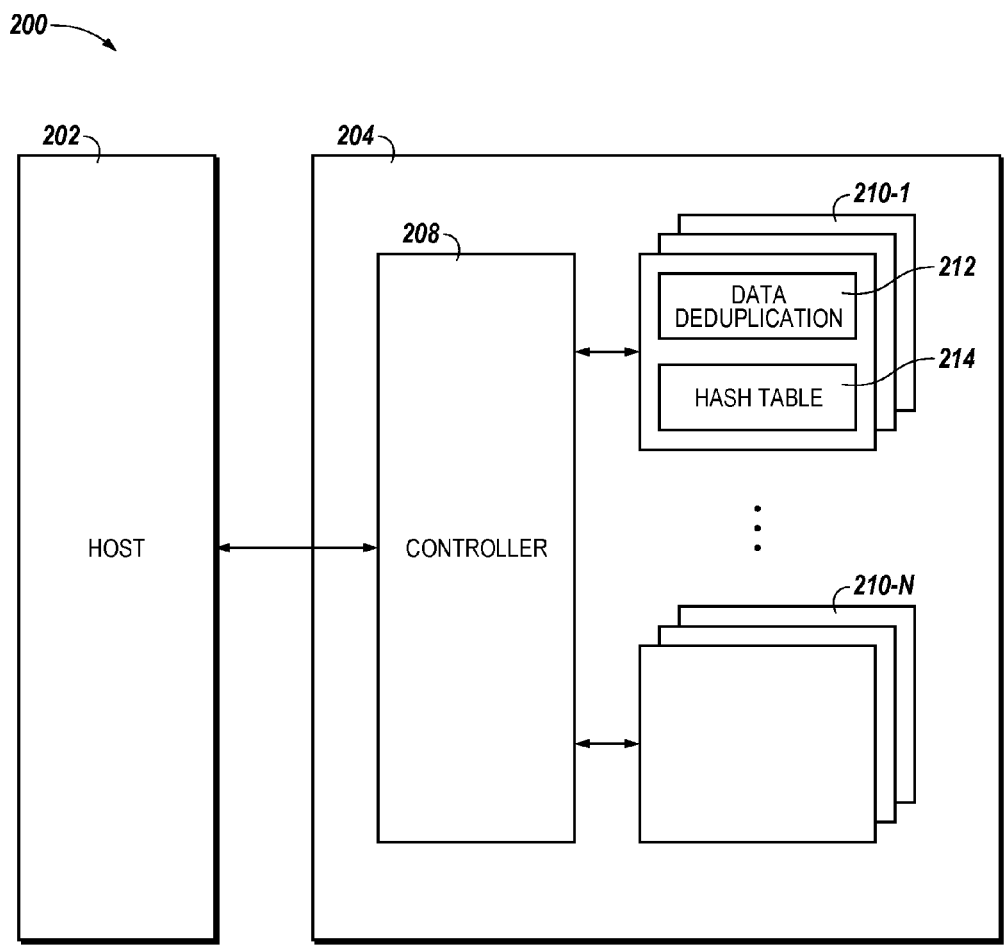
FIG. 2 is a functional block diagram of a computing device including at least one memory system, in accordance with one or more embodiments of the present disclosure.

FIG. 2 is a functional block diagram of a computing device 200 including at least one memory system 204, in accordance with one or more embodiments of the present disclosure. In the embodiment illustrated in FIG. 2, the memory system 204 can include a controller 208 and one or more memory devices 210-1, . . . , 210-N. In this example, the controller 208 is external to the one or more memory devices 210-1, . . . , 210-N, but in other embodiments the controller could be internal to one or more of the memory device or distributed between one or more of the memory devices and/or the controller 208. The memory devices 210-1, . . . , 210-N can provide a storage volume for the memory system, e.g., with a file system formatted to the memory devices. The controller 208 can include control circuitry, e.g., hardware, firmware, and/or software. In one or more embodiments, the controller 208 can be an application specific integrated circuit (ASIC) coupled to a printed circuit board including a physical interface and memory devices 210-1, . . . , 210-N.

The memory devices 210-1, . . . , 210-N can include a data deduplication component 212, such as part of an internal controller, e.g., control circuitry. The data deduplication component 212 can include hardware, firmware, and/or software and can perform data deduplication operations on data, as discussed above in association with FIG. 1. The memory devices 210-1, . . . , 210-N can include a hash table 214. The hash table can stored in memory cells of the memory devices 210-1, . . . , 210-N and can be used to associate a logical address with a hash value and also with a physical address for a portion of data, such as a sector, as discussed above in association with FIG. 1.

The controller 208 can communicate with the memory devices 210-1, . . . , 210-N to read, write, and erase data, among other operations. Controller 208 can have circuitry that may be one or more integrated circuits and/or discrete components. A memory controller could selectively couple an I/O connection (not shown in FIG. 1) of a memory device 210-1, . . . , 210-N to receive the appropriate signal at the appropriate I/O connection at the appropriate time. Similarly, the communication protocol between a host 202 and the memory system 204 may be different than what is required for access of a memory device 210-1, . . . , 210-N. Controller 208 could then translate the commands received from a host into the appropriate commands to achieve the desired access to a memory device 210-1, . . . , 210-N.

A memory device 210-1, . . . , 210-N can include one or more arrays of memory cells, e.g., non-volatile memory cells. The arrays can be phase change memory (PCM) arrays, for example. Embodiments are not limited to a particular type of memory device. For instance, the memory device can include RAM, ROM, DRAM, SDRAM, PCRAM, RRAM, and flash memory, among others.

The memory devices 210-1, . . . , 210-N can include a number of memory cells that can be grouped. As used herein, a group can include one or more memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included on a die. As an example, a 128 GB memory device can include 4314 bytes of data per page, 128 pages per block, 2048 blocks per plane, and 16 planes per device.

FIG. 3 illustrates a hash table 314 representing a number of logical addresses, hash values, and physical addresses in accordance with one or more embodiments of the present disclosure. The hash table 314 in FIG. 3 includes a number of columns. The first column 320 indicates logical addresses (LAs) of particular portions of data, such as a sector, for example. The second column 330 indicates hash values of particular portions of data. The third column 340 indicates physical addresses (PAs) of particular portions of data. The physical addresses of particular portions of data include a pointer to the physical location of that portion of data in a memory device.

In the example shown in FIG. 3, column 320 includes a number of different logical addresses 320-1 ("LA-1"), 320-2 ("LA-2"), 320-3 ("LA-3"), 320-4 ("LA-4"), 320-5 ("LA-5"), 320-6 ("LA-6"), and 320-M ("LA-M"). Each logical address is associated with a respective hash value 330-1 ("H-1"), 330-2 ("H-2"), 330-3 ("H-3"), and 330-M ("H-M").

In one or more embodiments, the logical addresses in column 320 of hash table 314 and their associated hash values in column 330 can be associated with physical addresses in column 340 that indicates a physical location of data in a memory system, e.g., system 104 in FIG. 1, associated with the logical addresses in column 320 and the hash values in column 330. Each logical address 320-1, 320-2, 320-3, 320-4, 320-5, 320-6, and 320-M and associated hash value 330-1, 330-2, 330-3, and 330-M can have an associated physical address 340-1 ("PA-1"), 340-2 ("PA-2"), 340-3 ("PA-3"), and 340-M ("PA-M"). The logical addresses sharing a common hash value can be associated with the same physical location. This allows for data associated with two or more logical addresses to be written to the memory devices only once.

In the example shown in FIG. 3, logical address 320-1 is associated with hash value 330-1 and the data associated with logical address 320-1 is at a physical location in a memory device associated with physical address 340-1. Logical address 320-2 and logical address 320-5 are associated with hash value 330-2 and the data associated with logical address 320-2 and logical address 320-5 is at a physical location in a memory device associated with physical address 340-2.

Logical address 320-3, logical address 320-4, and logical address 320-6 are associated with hash value 330-3 and the data associated with logical address 320-3, logical address 320-4, and logical address 320-6 is at a physical location in a memory device associated with physical address 340-3. Logical address 320-M is associated with hash value 330-M and the data associated with logical address 320-M is at a physical location in a memory device associated with physical address 340-M.

The logical address 320-1 is associated with a hash value 330-1 and the data associated with logical address 320-1 is at a physical location in a memory device associated with physical address 340-1. In some embodiments, any data that is associated with, e.g., part of, a write command received by a memory system that shares a common hash value, e.g., hash value 330-1, will not be written to a memory device, but can have its logical address associated with a common hash value 330-1 and a common physical address 340-1.

In this example, logical addresses 320-2 and 320-5 correspond to identical data, therefore they share a common hash value, hash value 330-2. The data associated with logical addresses 320-2 and 320-5 is written once to a physical location associated with physical address 340-2, thus the data associated with the logical addresses 320-2 and 320-5 is only written to the memory devices once. In some embodiments, any data that is associated with a write command received by a memory system that shares a common hash value, e.g., hash value 330-2, will be associated with a common physical location having a common physical address, e.g., 340-2. When the data associated with logical addresses 320-2 and 320-5, are accessed, e.g., requested in read commands, the hash table 314 can be used to identify the physical location of the data via the physical address 340-2 associated with logical addresses 320-2 and 320-5 and commands to read associated with logical addresses 320-2 and 320-5 can be read from the same physical location.

In this example, the logical addresses 320-3, 320-4, and 320-6 correspond to identical data, therefore they share a common hash value, hash value 330-3. The data associated with logical addresses 320-3, 320-4, and 320-6 is written once to a physical location associated with physical address 340-3, thus the data associated with the logical addresses 320-3, 320-4, and 320-6 is only written to the memory devices once. In some embodiments, any data that is associated with a write command received by a memory system that shares a common hash value, e.g., hash value 330-3, will be associated with a common physical location having a common physical address, e.g., 340-3. When the data associated with logical addresses 320-3, 320-4, and 320-6, are accessed, e.g., requested in read commands, the hash table 314 can be used to identify the physical location of the data via the physical address 340-3 associated with logical addresses 320-3, 320-4, and 320-6 and commands to read associated with logical addresses 320-3, 320-4, and 320-6 are read from the same physical location.

In one or more embodiments, a hash table can include hash values and physical locations for data associated with the hash values. In some embodiments, data that is associated with a hash value that exists in a hash table will not be written to a memory device. A hash table can include a list of hash values and a list of physical locations associated with each hash value that can be used to determine if data associated with a hash value is located at a physical location in a memory device and if it is not necessary to write the data associated with the hash value in a memory device because it is already located at a physical location in a memory device.

CONCLUSION

The present disclosure includes devices and methods for data deduplication. One such method includes receiving a write command, transforming data associated with the write command, determining if a transformation value of the data exists in a transformation table, and responsive to a determination that the transformation value does not exist in the transformation table, writing the data associated with the write command to a memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for data deduplication, comprising:
  receiving a write command;
  translating the write command into a number of memory device write commands that each include instructions that, when executed, cause a memory device to perform a write operation which writes a particular amount of data to the memory device;
  transforming data associated with the write command by creating a number of transformation values for the data, wherein each of the number of transformation values correspond to a portion of data that is less data than the particular amount of data;
  determining, for each of the number of transformation values, if a respective transformation value for the data exists in a transformation table; and
  writing the particular amount of data to the memory device, wherein writing the particular amount of data includes only writing data associated with the command having transformation values that do not exist in the transformation table while skipping writing data associated with the command with transformation values that exist in the transformation table.

2. The method of claim 1, wherein receiving the write command includes receiving the write command to a controller from a host.

3. The method of claim 1, wherein determining if the respective transformation value for the data exists in the transformation table includes locating transformation values in the transformation table stored in the memory device.

4. The method of claim 1, wherein determining if the respective transformation value for the data exists in the transformation table includes locating transformation values in the transformation table.

5. The method of claim 1, wherein the method further includes writing the number of transformation values to the transformation table.

6. The method of claim 1, wherein the method further includes associating each of the number of transformation values and a particular physical address via the transformation table.

7. The method of claim 1, wherein transforming data associated with the write command includes hashing the data associated with the write command.

8. A method for data deduplication, comprising:
hashing data associated with a write command via a data deduplication component on a memory device, wherein the data includes a number of portions of data each comprised of a first amount of data that is less than a second amount of data, wherein the second amount of data is a particular amount of data written via a write operation, and wherein hashing data includes creating hash values for each of the number of portions of data comprised of the first amount of data; and
executing at least a portion of the write command by writing the particular amount of data, wherein writing the particular amount of data includes only writing the number of portions of data having hash values that do not exist in a hash table while skipping writing those of the number of portions of data having hash values that exist in the hash table.

9. The method of claim 8, wherein hashing data associated with the write command includes creating a hash value for each of the number of portions of data.

10. The method of claim 9, further including writing, to the hash table, the hash value of each of the number of portions the data associated with the write command that is not in the hash table.

11. The method of claim 10, wherein writing, to the hash table, the hash value of each of the number of portions the data associated with the write command that is not in the hash table includes writing to phase change memory cells.

12. The method of claim 8, further including sending a successful write indication to a host for the number of portions of data with hash values that exist in the hash table and associating a logical address of the data with the hash value that exists in the hash table.

13. The method of claim 8, including associating a number of logical addresses that share a common hash value with a common physical location in the memory device via the hash table.

14. A device, comprising:
an array of memory cells; and
a controller coupled to the array and configured to:
hash data associated with a write command received from a host, wherein the controller translates the write command into a number of memory device write commands that each include instructions that, when executed by the controller, cause the array of memory cells to perform a write operation which writes a particular amount of data to the array of memory cells, wherein the data includes a number of portions of data that are each an amount of data that is less than the particular amount of data written via the write operation, and wherein a hash value for each of the number of portions of data is created; and
execute a write operation writing the particular amount of data to the array of memory cells, wherein writing the particular amount of data includes only writing portions of data having hash values that are not in a hash table while skipping writing portions of data having hash values in the hash table.

15. The device of claim 14, wherein the controller is configured to send a successful write indication to a host for portions of data having hash values in the hash table.

16. The device of claim 14, wherein the controller is configured to associate logical addresses of portions of data having hash values in the hash table with the hash values that exists in the hash table.

17. The device of claim 14, wherein the controller is configured to determine if hash values exist in the hash table via data deduplication circuitry.

18. The device of claim 14, wherein the number of portions of data are sectors of data and the particular amount of data written via the write operation is a page of data.

19. The device of claim 14, wherein the hash table is stored in the controller.

20. The device of claim 14, wherein the hash table is stored in the array of memory cells.

* * * * *